United States Patent [19] [11] 3,863,977
Hardinge [45] Feb. 4, 1975

[54] VEHICLE SUPPORTED COLLAPSIBLE SHELTER

[75] Inventor: Arthur D. Hardinge, Scarborough, Ontario, Canada

[73] Assignee: The Raymond Lee Organization, Inc., New York, N.Y. ; a part interest

[22] Filed: Feb. 9, 1973

[21] Appl. No.: 331,285

[52] U.S. Cl. ............ 296/23 MC, 296/26, 135/1 A
[51] Int. Cl. .............................................. B60p 3/34
[58] Field of Search .......... 296/23 MC, 23 R, 23 E, 296/23 G, 26; 135/1 A, 3 A, 4 A, 5 A

[56] References Cited
UNITED STATES PATENTS

| | | | |
|---|---|---|---|
| 2,246,813 | 6/1941 | Preston | 296/26 |
| 3,020,919 | 2/1962 | Crump | 135/1 A |
| 3,394,719 | 7/1968 | Hanson | 135/1 A |
| 3,410,598 | 11/1968 | Davis | 296/23 R |
| 3,479,079 | 11/1969 | Coursault | 296/26 |

Primary Examiner—Philip Goodman
Attorney, Agent, or Firm—Daniel Jay Tick

[57] ABSTRACT

A collapsible shelter adapted to be supported by a vehicle comprises a plurality of brackets removably affixed to a vehicle. A plurality of support members are removably affixed to the brackets to form a framework. Covering material removably affixed to the support members encloses the area bordered by the framework and the vehicle.

5 Claims, 8 Drawing Figures

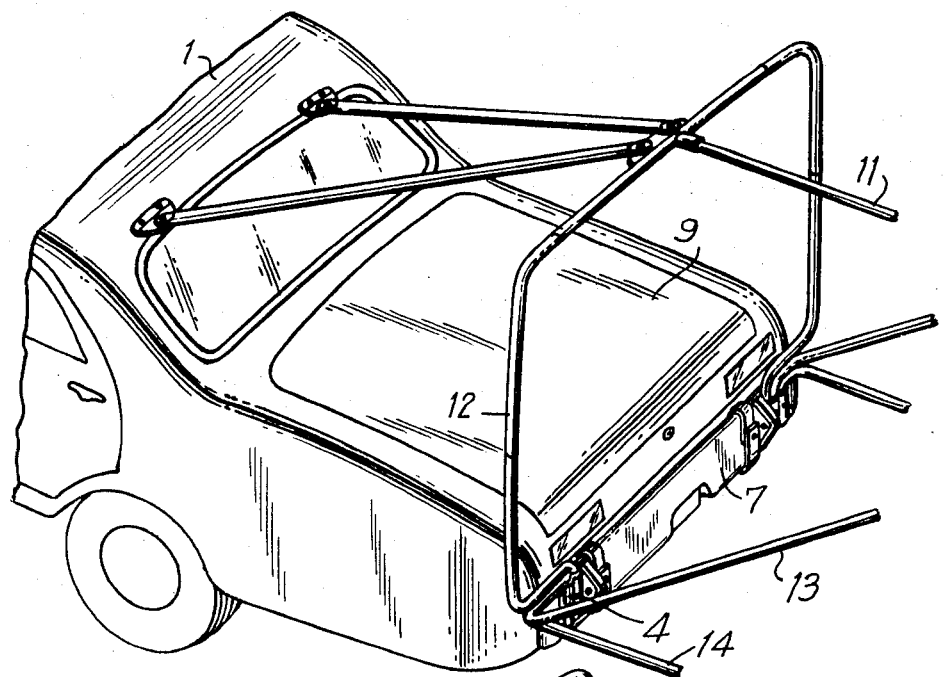
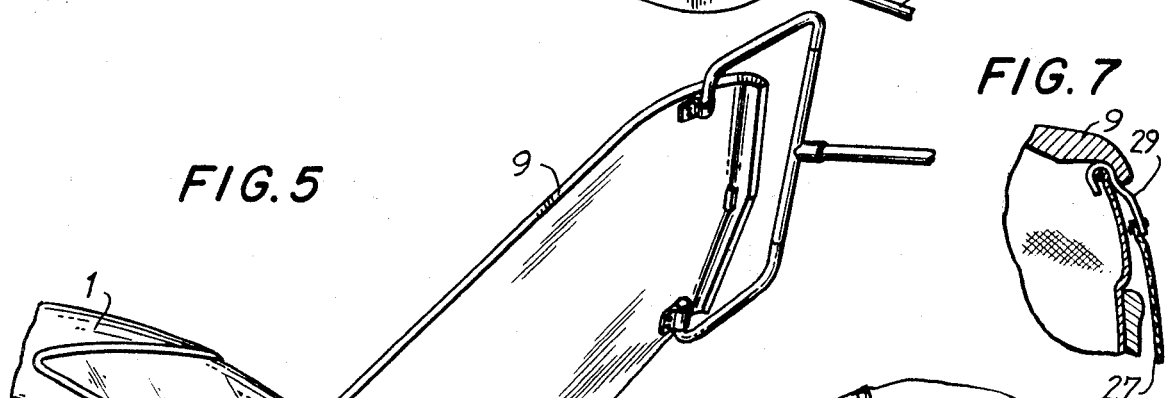
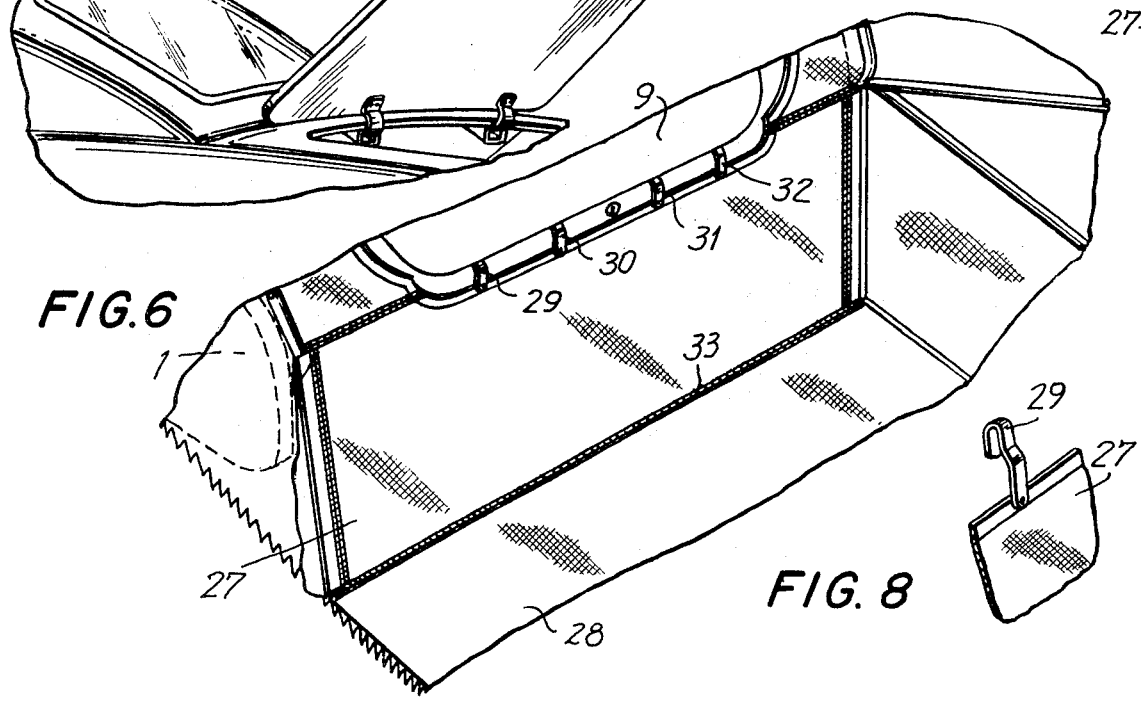

VEHICLE SUPPORTED COLLAPSIBLE SHELTER

DESCRIPTION OF THE INVENTION

The present invention relates to a vehicle supported collapsible shelter. More particularly, the invention relates to a collapsible shelter adapted to be supported by a motor vehicle.

The principal object of the invention is to provide a vehicle supported collapsible shelter which is of simple structure, is inexpensive to manufacture, is lightweight and collapsible to a minimal volume, is erectable and collapsible with rapidity, facility, convenience and without the need for skill, and which provides shelter from the elements and from people.

In order that the invention may be readily carried into effect, it will now be described with reference to the accompanying drawing, wherein:

FIG. 4 is a perspective view of brackets and support members of the collapsible shelter of the invention mounted on a vehicle;

FIG. 5 is a view of brackets of the collapsible shelter of the invention mounted on the trunk lid of a vehicle;

FIG. 6 is a view of the privacy flap and mat of the collapsible shelter of the invention extending from a vehicle;

FIG. 7 is a cross-sectional view of part of the privacy flap of the collapsible shelter of the invention and part of a vehicle from which it extends; and FIG. 8 is a perspective view of a hook of the privacy flap of the collapsible shelter of the invention.

In the FIGS., the same components are identified by the same reference numerals.

Figure 1:
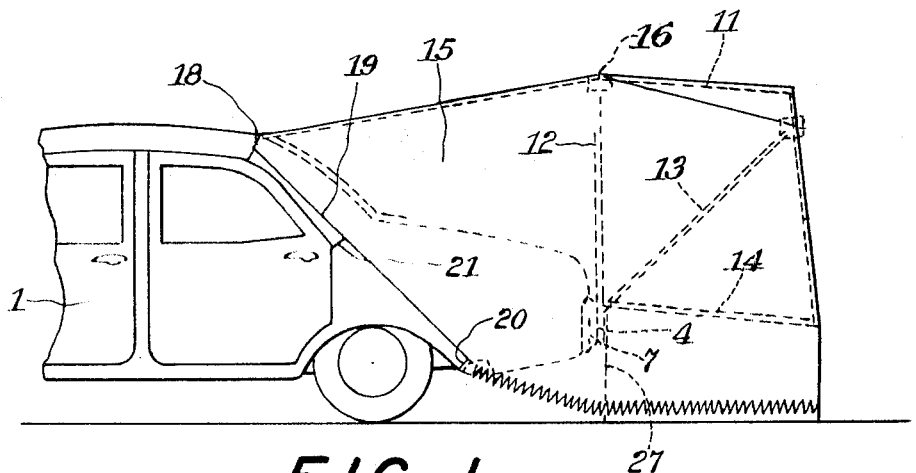
FIG. 1 is a side view of an embodiment of the collapsible shelter of the invention in erected condition.
Figure 3:
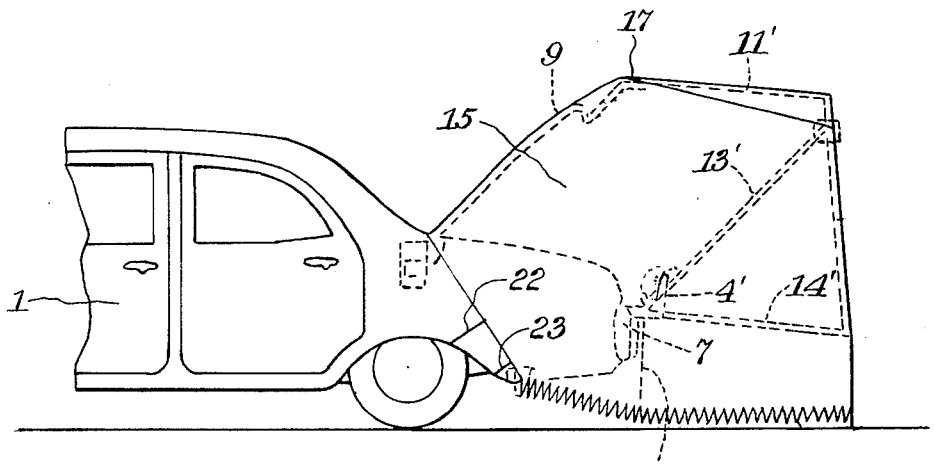
FIG. 3 is a side view of another embodiment of the collapsible shelter of the invention in erected condition.

The collapsible shelter of the invention is adapted to be supported by a motor vehicle 1 (FIGS. 1 and 3). The shelter of the invention comprises a plurality of brackets 4, and so on (FIG. 1), and 4', and so on (FIG. 3), removably affixed to the vehicle 1. The brackets are affixed to the rear bumper 7 (FIG. 4), the rear roof edge (FIG. 4) and the trunk lid 9 (FIG. 3 and FIG. 5) of the vehicle 1.

A plurality of support members 11, 12, 13, 14, and so on (FIG. 1), and 11', 13', 14', and so on (FIG. 3), are removably affixed to the brackets on the vehicle such as, for example, 4 and 4', to form a framework. The support members may comprise any suitable material such as, for example, aluminum tubes. The support members or tubes are supported by a tubular T joint type bracket 16 welded to the support member 12 (FIG. 1) or a tubular T joint 17 (FIG. 3) mounted on the trunk lid. The support members 11 and 11' fit into the T joint 16 and 17, respectively.

Covering material 15 of any suitable type such as, for example, tent canvas, or the like, is removably affixed to the support members 11, 11', and so on, and encloses the area bordered by the framework and the vehicle in the manner of a tent.

Figure 2:
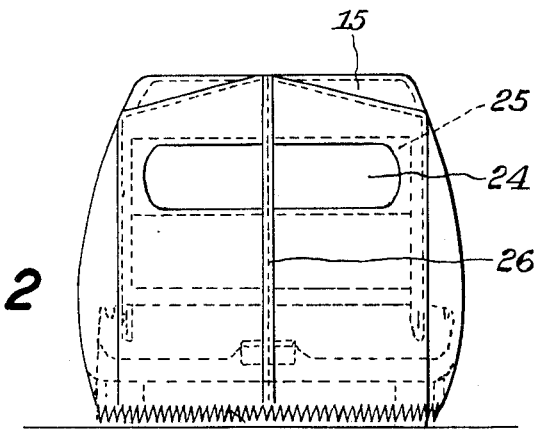
FIG. 2 is a rear view of the embodiment of FIG. 1 in erected condition.

In the embodiment of FIGS. 1 and 2, the covering material 15 is draped over part of the vehicle 1 and is held by spring cords 18, 19, 20 and 21 and hooks and clips. In the embodiment of FIG. 3, the covering material is also draped over part of the vehicle 1 and is held by spring cords 22 and 23 and hooks and clips.

The covering material 15 has a window 24 formed therein (FIG. 2) and a flap 25 for selectively covering said window (FIG. 2). Other flaps are provided for covering any openings, as desired. The shelter of the invention is accessible via any suitable means such as, for example, a zipper 26 (FIG. 2).

The area enclosed by the shelter of the invention is determined by the lengths of the support members. Thus, shelters extending farther away from the vehicle 1 may be readily provided by utilizing longer support members.

A privacy flap 27 (FIGS. 6, 7 and 8) and mat 28 (FIG. 6) are provided in a single sheet of material and are provided at the rear of the motor vehicle 1 and the flap extends from the lower extremities of the vehicle to the ground. The privacy flap 27 is secured by hooks 29, 30, 31 and 32 (FIGS. 6, 7 and 8) over the trunk aperture of the vehicle 1 at the rear edge thereof. The privacy flap 27 and mat 28 are also secured by suitable fastening means such as, for example, lace ties or zippers 33 (FIG. 6) and are placed at a suitable elevation to protect the fastening means from dirt, sand, mud, and the like. The mat 28 covers the ground at the rear of the vehicle over which the framework extends to protect the feet of a user.

While the invention has been described by means of specific examples and in specific embodiments, I do not wish to be limited thereto, for obvious modifications will occur to those skilled in the art without departing from the spirit and scope of the invention.

I claim:

1. A collapsible shelter adapted to be supported by a motor vehicle having a rear bumper and a rear roof edge, said shelter comprising
    a plurality of brackets removably affixed to a vehicle, some of the brackets being affixed to the rear bumper and some of the brackets being affixed to the rear roof edge;
    a first plurality of support members removably affixed to the brackets and a second plurality of support members affixed to the first plurality of support members and to each other and independent from the ground on which the vehicle rests to form a framework over part of the vehicle and an area of ground behind the vehicle; and
    covering material removably affixed to the support members for enclosing the area bordered by the framework and the vehicle, said material extending substantially to the ground in the area of ground.

2. A collapsible shelter as claimed in claim 1, wherein the vehicle has a trunk having a trunk lid and some of the brackets are affixed to the trunk lid.

3. A collapsible shelter as claimed in claim 1, further comprising a privacy flap at the rear of the vehicle extending from the lower extremities of the vehicle to the ground.

4. A collapsible shelter as claimed in claim 1, further comprising a mat in the area of ground at the rear of the vehicle covering said ground.

5. A collapsible shelter as claimed in claim 1, wherein the vehicle is a motor vehicle having a trunk and further comprising a single sheet of material functioning as a privacy flap extending from the lower extremities of the vehicle to the ground and a cover for the ground over which the framework extends and secured by hooks on the vehicle at the rear edge of the trunk and by fastening means.

* * * * *